E. SIEGEL.
VEHICLE LOCK.
APPLICATION FILED OCT. 20, 1920.
1,434,966.
Patented Nov. 7, 1922.
2 SHEETS—SHEET 1.
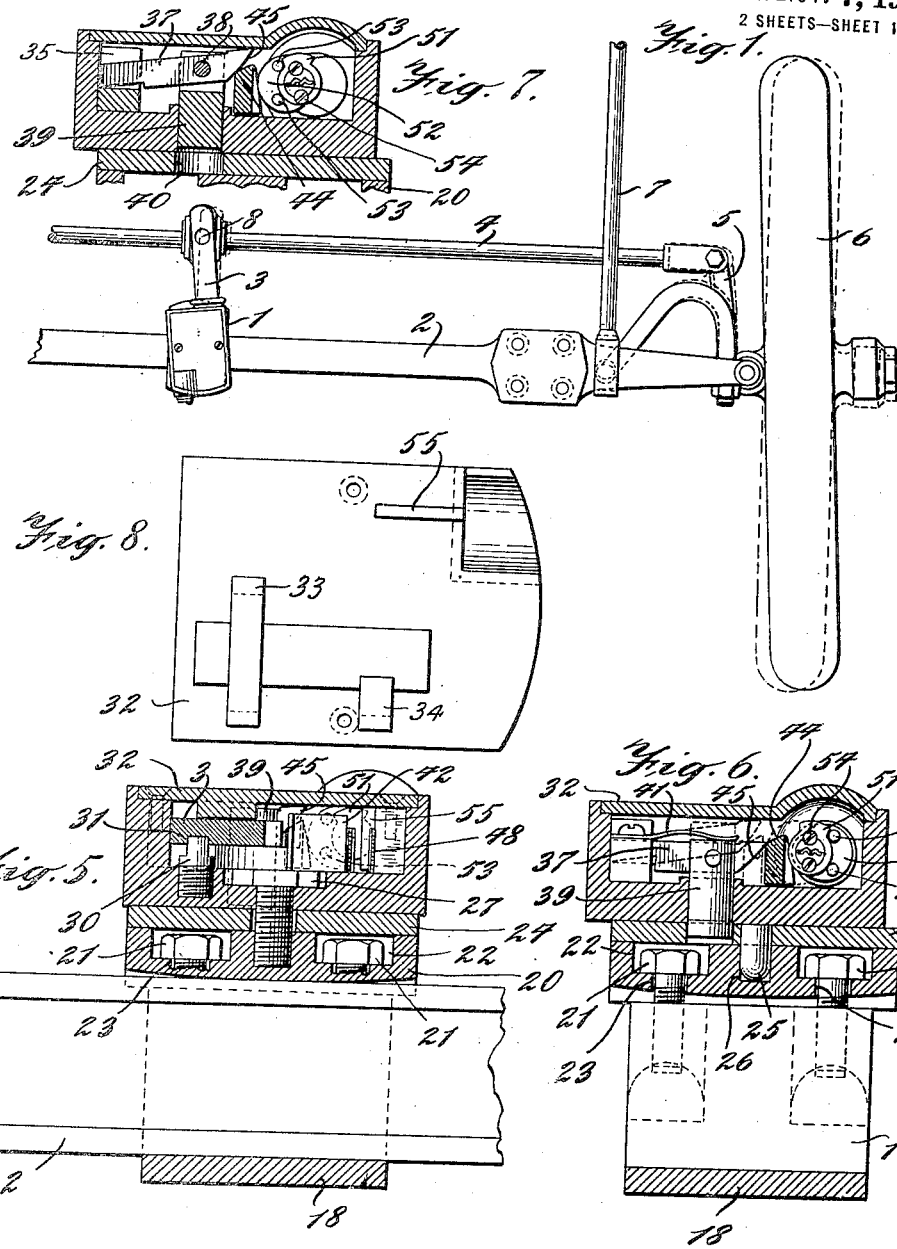
INVENTOR.
Ernest Siegel
BY
Rosenbaum Duckbridge & Borst
ATTORNEYS

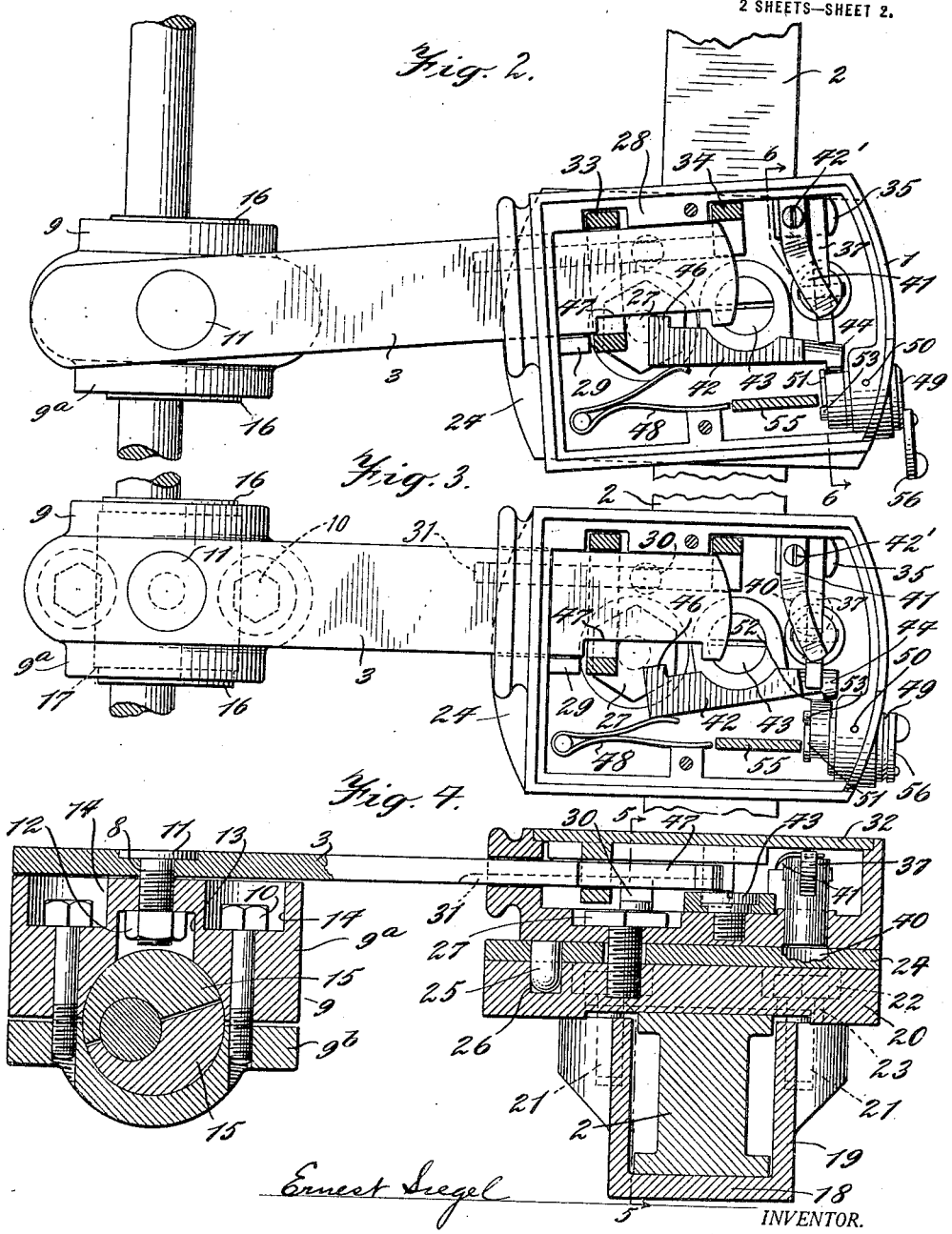

Patented Nov. 7, 1922.

1,434,966

UNITED STATES PATENT OFFICE.

ERNEST SIEGEL, OF NEW YORK, N. Y., ASSIGNOR TO AXLE LOCK CORPORATION, A CORPORATION OF NEW YORK.

VEHICLE LOCK.

Application filed October 20, 1920. Serial No. 418,207.

*To all whom it may concern:*

Be it known that I, ERNEST SIEGEL, a citizen of the United States, residing at the city of New York, in the county of New York and State of New York, have invented certain new and useful Improvements in Vehicle Locks, of which the following is a full, clear, and exact description.

This invention relates to locking devices for vehicles for the purpose of preventing their theft or unauthorized use, and is in the nature of an improvement on the devices disclosed in my pending applications, #368,862 and #395,210, filed March 26, 1920, and July 10, 1920, respectively. In those applications I have disclosed locks which conform with the underwriters regulations and the fire laws of various localities by enabling the movement of the locked vehicles for limited distances, such as 100 to 200 feet for example, if the necessity arises, and which at the same time prevent further movement of the locked vehicles from the parking place either under their own power or by towing until after they have been unlocked. I have also disclosed locking devices in which the attaching parts and the locking mechanism are concealed in such a manner that access can only be had thereto after the locking devices are in unlocked condition, so that the device cannot be removed or rendered ineffective while in locked condition. These locking devices are most commonly applied to the cross steering rod and the front axle, and if an exceptionally strong force is applied to the steering mechanism when the cross steering rod and axle are locked together, the cross steering rod, due to its length and slenderness, may often be sprung sufficiently to enable a limited steering of the vehicle, thus under some circumstances permit the movement of the vehicle through a considerable distance to a place where the thief could at leisure remove the lock.

An object of the invention is to provide a locking device having all the advantages of the locking devices disclosed in my pending applications referred to hereinbefore, and which can be connected between the cross steering rod and the front axle and prevent all steering movement of the vehicle even when exceedingly strong forces are applied to the steering wheel. A further object is to provide a lock for vehicles which can be readily and quickly applied to existing types of vehicles, which is simple in construction, durable and reliable in use, and inexpensive to manufacture. Other objects and advantages will be apparent from the following description and the novel features of my invention will be particularly pointed out in claims.

The invention comprehends the provision of a rod which is pivotally secured to one of the relatively moving parts such as the cross steering rod, a casing which is pivotally secured to the other of the parts such as the front axle and into which casing the rod projects, and locking mechanism which is carried within the casing and which in one condition locks the casing against pivotal movement on the axle and the rod against removal from the casing, and in the other condition unlocks both. The cover of the casing is locked in closed position by the rod at all times while it is within the casing and thereby access to the mechanism, except by means of a proper key or other similar operating member, is prevented. The invention also comprehends various details of construction and arrangement which will be more fully set forth hereinafter.

In the drawings:

Fig. 1 is a plan of a portion of a vehicle showing the manner of application of my invention thereto, the locked position of the movable parts being shown in full lines and the normal straight forward running position of these parts being indicated by the dotted lines.

Fig. 2 is a plan of a lock constructed in accordance with my invention, a portion of the cover of the casing having been removed in order to show the locking mechanism within the casing in its locked condition.

Fig. 3 is a plan similar to Fig. 2 but with the locking mechanism in its unlocked condition.

Fig. 4 is a sectional elevation of the locking device and the vehicle parts to which it is attached.

Fig. 5 is a sectional elevation taken substantially along the line 5—5 of Fig. 4.

Fig. 6 is a transverse sectional elevation of the device, the locking mechanism being in locked condition.

Fig. 7 is a sectional elevation somewhat similar to that of Fig. 6 but with the mechanism in its unlocked condition and Fig. 8 is a plan of the under face of the cover of the casing.

In the illustrated embodiment I pivotally secure a casing 1 to the front axle 2 of a vehicle, and reciprocating in the casing is one end of a locking bar or rod 3 which is pivotally secured to the cross connecting or steering rod 4 by means of which the steering knuckles 5 of the wheels 6 (only one of which knuckles and wheels is shown) are caused to move in unison whenever one of them is shifted by the rod 6, under the control of the steering wheel (not shown).

The bar 3 is pivoted by a bolt 8 to the flat top of one section $9^a$ of a split collar 9, the other section $9^b$ of which is secured to the section $9^a$ by the cap screws 10 which pass through one section and thread into the other section. The bolt 8 is provided with a round head 11 which is countersunk into the upper face of the bar or rod 3, and with a nut 12 which is disposed within a cavity 13 in the under face of the upper section $9^a$ of the split collar.

The upper section of the split collar is provided with cavities or depressions 14 which receive therein the heads of the cap screws 10. When the bar 3 extends transversely of the cross steering rod it covers both of these cavities 14 and prevents access being had to the cap screws 10. In order to obtain access to the cavities 14 and cap screw 10 the bar 2 must be shifted until it is substantially parallel with the cross steering rod, the bar being narrow enough to expose the cavities when in this position. Split bushing elements 15 are gripped between the two sections of the collar, and the bushing elements in turn grip the cross steering rod. Thus when the cap screws 10 are tightened the bushing elements 15 will be forced together and into gripping engagement with the cross rod. The cross rod passes through the bushing elements 15 eccentrically thereof so that if the cap screws 10 are loosened to release the bushing elements the latter can be rotated about the cross rod and then by tightening of the screw clamp the split collar will be clamped securely to the cross rod. The rotation of the bushing elements carries therewith the split collar so that the latter is given a movement upon the cross rod like that of an eccentric strap and this movement is utilized in adjusting this lock for attachment to various makes of vehicles, as will be more fully hereinafter described. In order that the bushing elements can not be removed by driving from the split collar in a direction longitudinally of the cross rod I provide reduced annular end portions 16 upon the bushing elements 15 and provide internal flanged rings 17 at each end of the split collar which engage over the reduced end portions 16 and lock the bushings against endwise movement, relatively to the collar.

Upon the front axle 2 is placed a U-shaped member 18 with the arms 19 thereof embracing the sides of the axle. The arms 19 are of a length sufficient to bring their free ends substantially in line with the upper face of the axle and upon the free ends of these arms and passing over the axle is a clamping plate 20 which is secured to the arms 19 by means of cap screws 21 countersunk into the plate 20 by means of cavities 22 and threaded lengthwise into the arms 19. The cavities 22 in the upper face of the plate 20 are larger than the heads of the cap screws 21 and together with elongated slots 23 in the plate which connect the cavities 22 to the lower face of the plate and through which the cap screws 21 pass, permit of a slight movement of the plate relatively to the arms 19 and transversely of the axle, and this limited adjustment is utilized in adjusting the lock to various sizes of vehicles. The tightening of the cap screws 21 securely clamps the plate 22 to the U shaped member 18 in the adjusted position. A bearing plate 24 is placed upon the upper face of the plate 20 and a plurality of dowel pins 25 extend downwardly therefrom into cavities or recesses 26 of the plate 20 in order to prevent movement of the bearing plate 24 across the upper face of the plate 20. The bearing plate 24 covers the cavities 22 and prevents access being had to the cap screws 21 for removal of the clamping member 18 and the plate 20 from the axle.

The casing 1 is pivotally secured to the plate 20 by means of a cap screw 27 which passes through the bottom wall of the casing and the bearing plate 24 and is threaded into the plate 20, the head of the screw being preferably countersunk in the bottom wall of the casing. The casing is substantially co-extensive in area with the plates 24 and 20 and when in place thereby prevents removal of the plate 24 and the plate 20. The bar 3 at one end is reciprocatingly received into the end wall of the casing and extends considerably into the interior of the casing. The abutments 28 and 29 on the interior of the casing guide the bar 2 in its reciprocations into and out of the casing and provide in effect an elongated bearing surface. A pin 30 projects upwardly from the bottom wall of the casing beneath the bar 3 and by its engagement with the slot 31 in the under side of the bar, also assists in guiding the bar 3 into and out of the casing without binding. The casing is provided with a removable cover 32 which has a loop 33 depending into the casing through which the bar 3 passes when the latter is inserted into the casing. Thus the cover is locked against removal from the casing as long as the bar 3 is within the casing. The cover is also provided with a depending L shaped lug or half loop 34 which engages under the bar 3 at one side of the same to form an additional lock between the cover and the casing. The interior of the casing is provided with a lug 35 having a slot 36 therein extending transversely of the casing which receives one end of a bar 37 pivotally secured at 38 to a locking bolt 39. The locking bolt 39 is mounted for vertical reciprocation through the bottom wall of the casing and into and out of engagement with a locking cavity 40 in the bearing plate 24. A spring 41 secured at 42' to the lug 35 bears upon the upper end of the locking bolt 39 and tends to shift the same downwardly and into the cavity 40 when the position of the casing is such as to bring them into alignment.

A pawl or lever 42 is pivoted by means of a screw 43 to the bottom of the casing and one end of the pawl or lever is provided with a cam surface 44 which is adapted to move into engagement with the cam surface 45 upon the end of the bar 37, and operate the latter to cam the bar 37 upwardly about the lug 35 as a fulcrum and retract the locking bolt 39 into the casing and out of locking engagement with the plate 24. The opposite end of the pawl or lever 42 is provided with a hook 46 which engages in an elongated notch 47 in one edge of the bar 3 and prevents removal of the bar 3 from the casing during such engagement or removal far enough to release the cover. A spring 48 is disposed between the wall of the casing and the pawl or lever 42 to normally shift the latter so as to bring the hook 46 into locking engagement with the bar 3 and to shift the cam surface 44 out of engagement with the bar 37 and release the locking bolt 39.

The front wall of the casing is provided with an aperture within which is threaded a lock 49, and a pin 50 passes through the casing wall and into the lock from within the casing so as to secure it against removal from the casing by unscrewing. The pin 50 is placed in the wall of the casing to lie beneath the cover 32 and be concealed thereby when the latter is in place. While various types of locks may be employed, I prefer a lock of the rotary cylinder type which can be purchased in the open market and which has therein a rotatable cylinder operable by a key, the cylinder having upon the end which projects into the casing a cam member 51 which is concentric with an operating cam 52 rotatably carried by the inner end of the lug. The operating cam 52 is provided with pins 53 which are engaged alternately by the cam member 51 and shifted thereby. When the cylinder is rotated by a suitable key the cam member 51 will engage with one of the pins 53 and shift the operating cam 52 about the axis of the cylinder and into or out of engagement with that end of the pawl 42 having the cam surface 44 thereon. When the operating cam engages the pawl, it rotates the same against the action of the spring 48 to shift the locking hook 46 out of engagement with the notch 47 of the bar 3 and holds it in disengaged position, so as to permit of free reciprocation of the bar within the casing. At the same time that the bar 3 is disengaged the cam surface 44 of the pawl will engage with the cam surface 45 of the bar 37 and cam the latter upwardly to retract the locking bolt 39 into the casing and unlock the latter for rotation across the plate 24. This permits the casing to rotate about its pivot 27. When the cylinder is rotated by the key in the opposite direction the cam member 51 will engage with the other of the spaced pins 53 and shift the operating cam 52 out of engagement with the pawl 42, whereupon the spring 48 will shift the lever or pawl to carry the locking tooth 46 thereof into the notch 47 of the bar 3 and lock the latter against removal from the casing or removal far enough to release the cover. The movement of the cam surface 44 of the pawl from beneath the bar 37 releases the locking bolt 39 to the action of the spring 41, whereupon the latter thrusts the bolt 39 outwardly and against the bearing plate 24. As the casing is rotated about its pivot due to the movement of the bar 3 and cross steering rod 4, the locking bolt 39 will be forced by the spring 41 into the cavity 40 as soon as it is brought into alignment therewith and thus lock the casing against further movement in both directions. The operating cam will be locked in each of the operative positions mentioned, when the key is removed from the cylinder, due to its internal construction which is not per se a part of this invention.

The cams 51 and 52 are secured to the rotary cylinder in any convenient manner, as for example by screws 54 and in order to prevent any danger of the screws working out and releasing the cams, I may provide a depending lug 55 on the cover 32 of the casing which abuts against the end of the cylinder. A small protecting plate or disc 56 may be pivotally secured to the outer face of the lock 49 in order to prevent the entrance of dust or foreign matter into the keyhole, the plate being adjustable to cover the face of the lug or to expose the same as desired.

In applying this lock to a vehicle the bar 3 is separated from the casing after the lock has been placed in unlocked position, and the split collar 9 is attached to the cross steering rod by clamping. The U shaped clamping element 18 is passed upwardly or downwardly to embrace the front axle 2, in forward and rearward alignment with the split collar and the plate 20 is placed across the ends of the arms of the U-shaped clamping element and secured thereto by the screws 21. The bearing plate 24 is placed upon the plate 20 with the dowel pins 25 in the recesses 26 of the plate. The casing is then secured to the plates 24 and 20 by passing the pivotal securing screw 27 through the casing and plate 24 into the clamping plate 20. The cross rod 4 is next disengaged at one end from the knuckle of the steering mechanism and swung rearwardly sufficiently far to enable the insertion of the end of bar 3 within an aperture in the end of the casing. The cross rod is then brought forward and resecured to the knuckle. If the bar 3 is not on the level with the aperture in the end of the casing the clamping screws 10 of the split section may be loosened slightly, the bushing elements 15 rotated to elevate or lower the split collar until the bar 3 is brought into alignment with the aperture in the end of the casing. The screws 10 will then be tightened to securely clamp the split collar to the cross rod and the end of the bar inserted in the end of the casing as hereinbefore described. In vehicles where the distance between the front axle and the cross rod is exceptionally great or small, the plate 20 can be adjusted slightly along the upper or lower face of the axle by means of the cavities 22 and slots 23 in the plate, through which the securing screws 21 pass, the screws being tightened after the desired forward or rearward adjustment of the plate 20 has been completed and before the bearing plate 24 and casing 1 have been attached thereto. It will of course be understood that the cover 32 should be in place upon the casing before the bar 3 is inserted therein since the bar 3 passes through the depending loop 33 and over the depending hook 34 of the cover in order to lock the cover in place on the casing. In order to obtain access to the interior of the casing it is of course necessary to first withdraw the bar 3 from the casing in order to release the cover. The lock is now ready for operation and when the device is to be set to permit of a steering operation of the vehicle, the rotary cam 52 should be first shifted by the key to the position indicated in Fig. 7. In this position of the operating cam the pawl 42 is in engagement with the bar 37 and holds the locking bolt 39 in its upward or unlocked position within the casing. The hook 46 is also disengaged from the notch 47 of the bar and when the cross rod is shifted relatively to the axle in the normal operation of the vehicle, the bar 3 can reciprocate in and out of the casing and the casing can rotate upon the axle. When one desires to lock the steering mechanism of the vehicle it is only necessary to insert the key within the cylinder lock and rotate the operating cam 52 into the position indicated in Fig. 6, in which it is out of engagement with the pawl 42. When the pawl 42 has been released in this manner its spring 48 shifts it to carry the locking tooth 46 into the notch 47 of the bar, and prevent removal of the bar 3 from the casing to an extent which could release the cover. The steering mechanism does not have to be placed in any particular position in order to lock it, because as soon as the key is operated to release the pawl or lever 42 the bar 3 will be locked against removal from the casing and the locking bolt will be released. If an attempt is now made to move the vehicle over any considerable distance, some manipulation of the steering mechanism is necessary, and hence as the casing is oscillated by the cross steering rod, the locking bolt will be brought into alignment with the locking cavity 40 and shifted into locking engagement therewith by the action of the spring 41. The cavity 40 is placed in the plate 24 in such a position that the steering mechanism will be locked slightly to one side of a straight forward running position. Thus the vehicle can be moved for a short distance, such as 150 to 200 feet for example, if the necessity arose. A vehicle could therefore be removed from in front of a fire hydrant or burning building so as not to impede the fire department but could not be removed for any considerable distance which would be necessary in case of an attempted theft or unauthorized use. The attaching parts are so assembled that access can only be had for removal or disablement of the lock, when in an unlocked condition. The material employed in the construction is a metal which can be hardened, preferably case hardened so as to render destruction or disabling of the parts by a thief extremely difficult and to entail a considerable delay. Inasmuch as the removal of the key will lock the operating cam in either of its operative positions with respect to the locking lever or pawl 42 there is no danger of the jamming of the cam out of engagement with the pawl or lever and consequent locking of the steering mechanism without warning while the vehicle is being operated. Case hardened spacers may be employed between the plate 20 and the ends of the arms of the U shaped clamping element 18 whenever they are necessary in order to apply the lock to axles considerably greater in height than those of the ordinary vehicle. I have illustrated the locking device as applied to the cross rod and axle with the locking bar 3 upon the upper side thereof, but it is to be understood that if the apron under the hood interferes with this position of the lock, the lock can be placed upon the cross rod and axle with the bar 3 underneath the same. It is obvious that various changes in the details of construction herein described and illustrated may be made within the principle and scope of my invention.

I claim:

1. A lock for vehicles having two substantially parallel relatively moving parts and comprising a bar pivoted to one of said parts, a casing pivoted to the other of said parts, the free end of the bar being reciprocatingly received within the casing for rotating the latter during relative movement of the parts, and means within the casing and controlled from the exterior thereof for locking the casing against rotation about its pivot.

2. A lock for vehicles having two substantially parallel relatively moving parts and comprising a bar pivoted to one of said parts, a casing pivoted to the other of said parts, the free end of the bar being reciprocatingly received within the casing for rotating the latter during relative movement of the parts, and means within the casing and controlled from the exterior thereof for locking the casing against rotation about its pivot and the bar against complete removal from the casing.

3. A lock for vehicles having two substantially parallel relatively moving parts and comprising a bar pivoted to one of said parts, a casing pivoted to the other of said parts the free end of the bar being reciprocatingly received within the casing, an element carried within the casing for movement into and out of engagement with the part upon which the casing is mounted to lock the casing against rotation thereon, and means also within the casing and including a member operable from the exterior of the casing for causing locking and unlocking movements of the element and for locking the bar against entire removal from the casing when the casing is locked against rotation.

4. A lock for vehicles having two substantially parallel relatively moving parts and comprising a bar pivoted to one of said parts, a casing pivoted to the other of said parts the free end of the bar being reciprocatingly received within the casing, an element carried within the casing for movement into and out of engagement with the part upon which the casing is mounted to lock the casing against rotation thereon, a spring normally tending to shift the element into locking engagement with the part upon which the casing is mounted, a pawl pivoted to the interior of the casing and adapted when rotated in one direction to engage the element and cam it out of engagement with the part upon which the casing is mounted and to concomitantly release the bar, and adapted when rotated in the opposite direction to release the element to the action of its spring and to concomitantly lock the bar against removal from the casing, a spring device tending to shift the pawl in the latter direction, and locking means operable from the exterior of the casing for causing rotation of said pawl selectively in either direction to lock or unlock the casing.

5. A lock for vehicles having two substantially parallel relatively moving parts and comprising a bar pivoted to one of said parts, a casing pivoted to the other of said parts the free end of the bar being reciprocatingly received within the casing, an element carried within the casing for movement into and out of engagement with the part upon which the casing is mounted to lock the casing against rotation thereon, a spring normally tending to shift the element into locking engagement with the part upon which the casing is mounted, a pawl pivoted to the interior of the casing and adapted when rotated in one direction to engage the element and cam it out of engagement with the part upon which the casing is mounted and to concomitantly release the bar, and adapted when rotated in the opposite direction to release the element to the action of its spring and to concomitantly lock the bar against removal from the casing, a spring device tending to shift the pawl in the latter direction, and means including a rotary cam carried within the casing and operable from the exterior thereof for shifting said pawl against the action of its spring to unlock the casing from its support and to release the bar, and for releasing the pawl to permit of operation of both of said springs and locking movements of the pawl and element.

6. A lock for vehicles having two substantially parallel relatively moving parts and comprising a bar pivoted to one of said parts, a casing pivoted to the other of said parts, the free end of the bar being reciprocatingly received within the casing whereby relative movement of the parts will oscillate the casing on its pivot, a pin slidably mounted within the casing for movement through a wall thereof into locking engagement with the part upon which the casing is mounted, and key controlled means operable from the exterior of the casing for controlling the sliding movements of said pin, to lock or unlock the casing from the part upon which it is mounted.

7. A lock for vehicles having a front axle and a cross steering rod, a casing, means for pivotally mounting the casing upon the front axle, a locking bar pivotally connected to the cross steering rod and reciprocatingly received within said casing, a locking element mounted within the casing for projection therefrom into locking engagement with the mounting means, a spring tending to shift the element into locking position, a lever pivoted to the interior of the casing and having a cam surface thereon for engaging with said locking element to cam the latter out of engagement with the mounting means, a hook on said lever adapted to interlock with the bar when the lever moves to release the locking element and prevent entire removal of the bar from the casing, a spring normally urging the lever to interlocking engagement with the bar, and locking mechanism operable from the exterior of the casing for operating the lever against the action of its spring to disengage the lever from the bar and to concomitantly cam the locking element to unlocked position.

8. A lock for vehicles having a front axle and a cross steering rod, a casing, means for pivotally mounting the casing upon the front axle, a locking bar pivotally connected to the cross steering rod and reciprocatingly received within said casing, a locking element mounted within the casing for projection therefrom into locking engagement with the mounting means, a spring tending to shift the element into locking position, a lever pivoted to the interior of the casing and having a cam surface thereon for engaging with said locking element to cam the latter out of engagement with the mounting means, said bar having a notch therein, a hook on said lever adapted to interlock with the notch in the bar when the lever moves to release the locking element and prevent entire removal of the bar from the casing, means normally urging the lever into interlocking engagement with the bar, a key controlled lock carried in a wall of the casing, operable from the exterior of the casing and having within the casing a rotary cam in engagement with the lever and adapted when rotated to one position to shift the latter out of interlocking engagement and the locking element to unlocked position, to release the lever when rotated to another position.

9. A lock for vehicles having two substantially parallel relatively moving parts and comprising a bar pivoted to one of said parts, a casing having a removable cover, said cover having a member extending within the casing, means for pivotally mounting the casing upon the other of said parts and accessible for removal solely through the interior of the casing, the free end of the bar being reciprocatingly received within the casing and interlocking with the members extending from the cover to lock the cover closed upon the casing when the bar is within the casing, and locking means within the casing and controlled from the exterior thereof for locking the casing directly to the part upon which it is mounted and for concomitantly locking the bar against removal from the casing sufficiently to release the cover.

10. In a lock for vehicles having a front axle and a cross steering rod, a bar pivotally secured to the rod, a casing in which an end of the bar reciprocates, means for pivotally securing the casing to the axle, a bolt mounted for reciprocation in an aperture in a wall of the casing to engage with and be disengaged from the mounting means, a bar pivoted intermediate of its ends to the inner end of the bolt, a spring tending to shift the bolt into locking engagement with the mounting means, and locking means within the casing and operable from the exterior thereof for engaging with one end of said last named bar and shifting it about its other end as a fulcrum to retract the bolt into the casing and out of locking engagement with the securing means.

11. In a lock for vehicles having a front axle and a cross steering rod, a bar pivotally secured to the rod, a casing in which an end of the bar reciprocates, means for pivotally securing the casing to the axle, a bolt mounted for reciprocation in an aperture in a wall of the casing to engage with and be disengaged from the mounting means, a bar pivoted intermediate of its ends to the inner end of the bolt, a spring tending to shift the bolt into locking engagement with the mounting means, a pivoted lever within the casing having an end adapted when rotated in one direction to engage one end of the last named bar and rock it upon its other end as a fulcrum to retract the bolt into the casing and out of locking engagement with the mounting means, and when rotated in the opposite direction to release the last named bar and to move into interlocking engagement with the first named bar and prevent its complete removal from the casing, a spring tending to rotate the lever in the last named direction, a key controlled rotary cam device operable from the exterior of the casing for rotating the lever against the action of its spring to unlock the casing and release the first named bar.

12. In a lock for vehicles having a front axle and a cross steering rod, a bar pivotally secured to the rod, a casing in which an end of the bar reciprocates, a cover for the casing having a projection thereon interlocking with the portion of the bar within the casing to prevent removal of the cover while the bar is within the casing, means for pivotally securing the casing to the axle, a bolt slidably mounted for movement through a wall of the casing into and out of locking engagement with the securing means, a second bar pivoted intermediate of its ends to the bolt, a lever pivoted in the casing and adapted when rotated in one direction to engage one end of the second bar and shift it about its other end as a fulcrum to retract the bolt to unlocking position, a spring tending to shift the bolt to locking position, a spring tending to shift the lever out of engagement with the second bar, and key controlled cam means for shifting said lever against the action of its spring to shift the second bar and bolt to unlocking position, said lever and first mentioned bar having interlocking means operable when the locking bolt is released to prevent removal of the first mentioned bar from the casing sufficiently to release the cover.

13. A lock for vehicles having a front axle and a cross steering rod, a clamp secured to the cross rod, a bar pivoted to the clamp, a casing in which one end of the bar reciprocates, means for pivotally securing the casing to the axle, and key controlled means in said casing operable from the exterior thereof for locking said casing to its securing means and the axle for preventing relative movement between the cross rod and axle.

14. A lock for vehicles having a front axle and a cross steering rod, a clamp secured to the cross rod, a bar pivoted to the clamp, a casing in which one end of the bar reciprocates, means for pivotally securing the casing to the axle, and key controlled means in said casing operable from the exterior thereof for locking said casing to its securing means and the axle for preventing relative movement between the cross rod and axle, and for concomitantly locking the bar against removal from the casing.

15. A lock for vehicles having a front axle and a cross steering rod, a bar, means for pivotally attaching the bar to the rod, a casing into which one end of the bar projects and reciprocates, means for pivotally attaching the casing to the axle, and key operated means within the casing and operable from the exterior thereof for locking the casing to its attaching means and the axle to prevent rotation of the casing on the axle and relative movement between the cross rod and axle.

16. A lock for vehicles having a front axle and a cross steering rod, a bar, means for pivotally attaching the bar to the rod, a casing into which one end of the bar projects and reciprocates, means for pivotally attaching the casing to the axle, and key operated means within the casing and operable from the exterior thereof for locking the casing to its attaching means and the axle to prevent rotation of the casing on the axle and relative movement between the cross rod and axle, and for concomitantly locking the bar against entire removal from the casing.

17. A lock for vehicles having a front axle and a cross steering rod, a split clamp embracing said axle and having attaching means between the sections of the clamp accessible only from one face of the clamp, a casing, means passing through the bottom wall of the casing and into said one face of the clamp for pivotally securing the casing thereon, a bar reciprocatingly received at one end in an end wall of the casing, means for pivotally securing the other end of the bar to the cross rod, and means within the casing and controlled from the exterior thereof for locking the casing to said clamp to prevent rotation of the casing thereof and through it prevent movement of the cross steering rod.

18. A lock for vehicles having a front axle and a cross steering rod, a split clamp embracing said axle and having attaching means between the sections of the clamp accessible only from one face of the clamp, a casing, means passing through the bottom wall of the casing and into said one face of the clamp for pivotally securing the casing thereon, a bar reciprocatingly received at one end in an end wall of the casing, means for pivotally securing the other end of the bar to the cross rod, a cover for said casing having means interlocking with the end of the bar within the casing to prevent removal of the cover while the bar is within the casing, and means within the casing controlled from the exterior thereof for locking the casing to said clamp to prevent rotation of the casing thereof and through it prevent movement of the cross steering rod for locking the bar against removal from the casing sufficiently far to release the cover.

19. A lock for vehicles having a front axle and a cross steering rod, a split clamp embracing said axle and having attaching means between the sections of the clamp accessible only from one face of the clamp, a casing, means passing through the bottom wall of the casing and into said one face of the clamp for pivotally securing the casing thereon a bar reciprocatingly received at one end in an end wall of the casing, means for pivotally securing the other end of the bar to the cross rod, and means within the casing and controlled from the exterior thereof for locking the casing to said clamp to prevent rotation of the casing thereof and through it prevent movement of the cross steering rod, and for locking the bar against entire removal from the casing.

20. A lock for vehicles having a front axle and a cross steering rod, a bar, means for pivotally securing said bar to the rod and accessible for removal or loosening when the bar is substantially parallel with the rod and inaccessible when the bar is substantially transverse to the rod, a casing into which an end of the bar reciprocatingly projects, means for pivotally securing the casing to the axle in alignment with the normal forward running position of the rod, said casing securing means being accessible for removal solely through the interior of the casing, a cover for the casing interlocking with the portion of the bar within the casing to prevent removal of the cover while the bar is within the casing, and locking means within the casing and accessible for operation from the exterior thereof for locking the casing rigidly to the axle through the securing means, and also concomitantly locking the bar against removal from the casing to an extent sufficient to release the cover.

In witness whereof I hereunto subscribe my signature.

ERNEST SIEGEL.